Feb. 23, 1960 R. E. ROEGER 2,926,345
MACHINE TOOL LOCATING MECHANISM
Filed May 2, 1956 4 Sheets-Sheet 1

INVENTOR.
RICHARD E. ROEGER
BY Williams & Tilbury
ATTORNEYS

Feb. 23, 1960 R. E. ROEGER 2,926,345
MACHINE TOOL LOCATING MECHANISM
Filed May 2, 1956 4 Sheets-Sheet 2

INVENTOR.
RICHARD E. ROEGER
BY
ATTORNEYS

Feb. 23, 1960  R. E. ROEGER  2,926,345
MACHINE TOOL LOCATING MECHANISM
Filed May 2, 1956  4 Sheets-Sheet 3

*INVENTOR.*
RICHARD E. ROEGER
BY
ATTORNEYS

INVENTOR.
RICHARD E. ROEGER
BY
Williams & Tilbury
ATTORNEYS

United States Patent Office 2,926,345
Patented Feb. 23, 1960

2,926,345

MACHINE TOOL LOCATING MECHANISM

Richard E. Roeger, Mayfield Heights, Ohio, assignor to Cleveland Instrument Company, Cleveland, Ohio, a corporation of Ohio Application May 2, 1956, Serial No. 582,221

15 Claims. (Cl. 340—282)

This invention relates to apparatus for locating two or more relatively movable elements thereof, as parts of machine tool equipment, accurately with respect to each other irrespective of whether such relative motion is in a straight line, about an axis or otherwise. An example of such apparatus is an index table in which the rotating table is located in a preselected position with respect to its support.

I am aware that means have heretofore been proposed for locating such elements with respect to each other. However, the accuracies heretofore available in effecting such locating are not sufficiently accurate or reliable to meet present requirements wherever increasing accuracy is required because of the close tolerances currently required in certain areas of manufacture.

It is an object of this invention to provide a novel and improved apparatus incorporating positioning means by which one element of machine tool or like equipment is located with respect to a cooperating and relatively movable element and which apparatus does not require a highly skilled operator. It is a further object of this invention to provide such apparatus and positioning means which are more accurate than any now available. It is also an object of this invention to provide positioning means which will allow any position, within the limitations of accuracy, to be selected from a broad range of available positions merely by setting appropriate control dials and then initiating a sequence of electrical operations. It is a further object of this invention to provide apparatus with a novel positioning means incorporating an electrical vernier by which the position of the two elements with respect to each other may be determined with great precision. Still an additional object is to provide for locating the parts of such equipment with respect to each other in two stages, a first or coarse stage and a second or fine stage.

While only one embodiment of this invention as applied, for example, to an indexing table, is shown it is to be understood that it can be used for other purposes whenever machine tool or related equipment needing an accurate and variable positioning and locating means is required for relative location of elements movable with respect to each other. Therefore, the embodiment shown in the drawings and following description is intended for purposes of illustration and not limitation, and the invention is to be limited only by the appended claims.

Referring now to the drawings.

Figure 1:
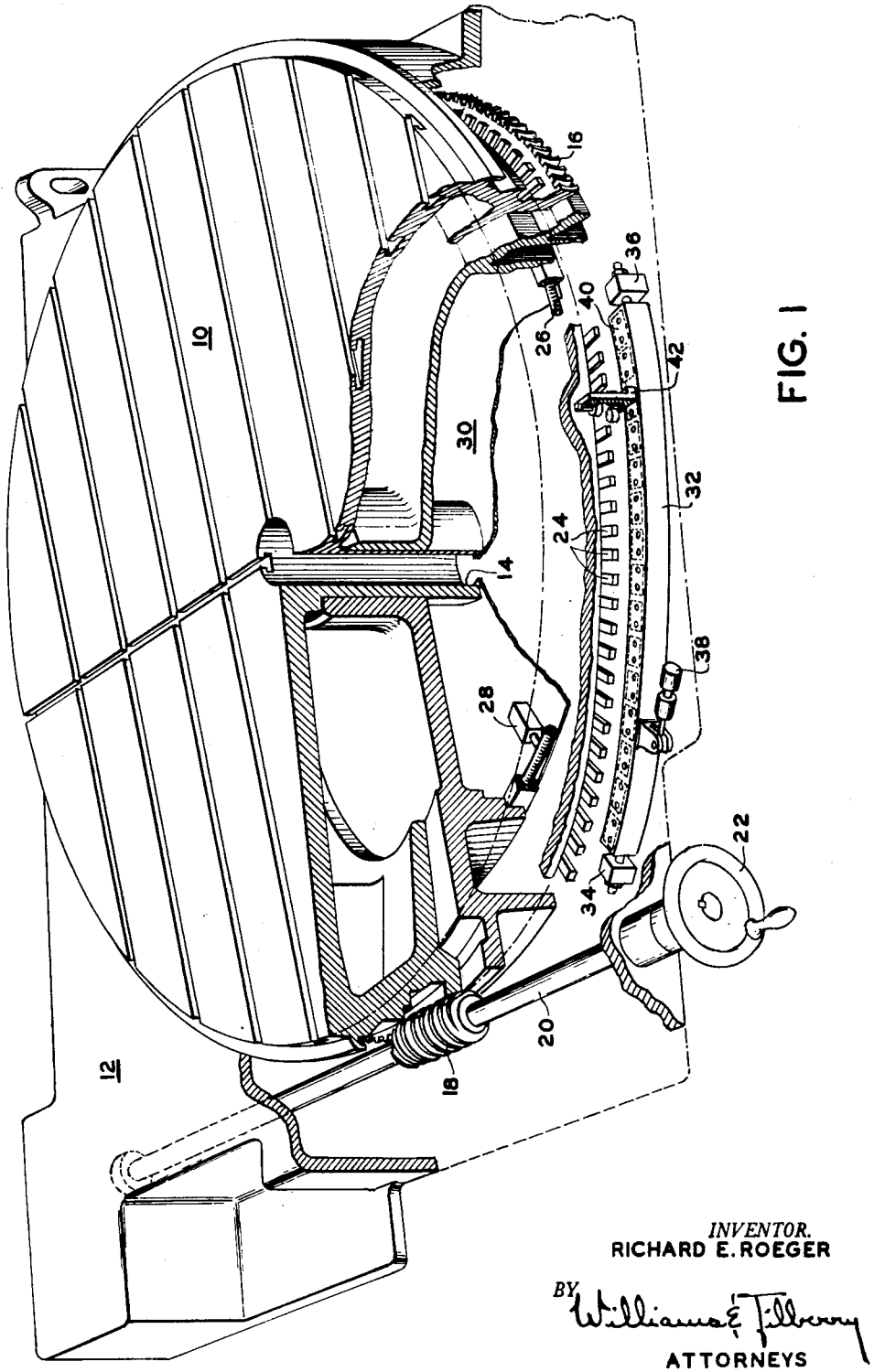
Figure 1 is a perspective view of the indexing table, hereafter described, with certain parts broken away.

Referring now to Figure 1, a table 10 is rotatably mounted on base 12 by means of a spindle 14 which is journaled in the base 12 to allow rotation of table 10 in a horizontal plane about the spindle axis with respect to the base 12. A worm gear ring 16 is mounted on the lower part of the outer circumference of table 10 and mates with the worm gear 18 mounted on shaft 20. Shaft 20 is rotatably journaled in base 12 and is provided with a hand wheel 22 by which the operator can rotate shaft 20 and hence table 10 to place the same in a desired position with respect to the base.

As part of the locating apparatus there are attached to table 10 360 lug-shaped armatures 24 which are secured to the table 10 above gear 16 and project radially therefrom. These armatures 24 all have identical dimensions and magnetic characteristics and are carefully spaced at one degree intervals around the circumference of the table. Beneath table 10 and carried by base 12 is a potentiometer ring, preferably in the form of a wire wound ring in the shape of a toroidal coil of large diameter and small coil cross section. A wiper ram 28 to make electrical engagement with the turns of the toroidal coil as it moves past them is mounted on a radial flange 30 which is secured to sleeve 14 of table 10.

To carry the transducers hereafter described, an arcuate shift bar 32 is slidably mounted on base 12 for movement between end stops 34 and 36 in an arcuate path concentric with the axis of table 10. These ends stops 34 and 36 allow a slight predetermined movement of shift bar 32 so that the shift bar 32 may be retained in either of two positions, that is, in contact with end stop 34 or end stop 36. A solenoid 38 connected, as shown, to the shift bar controls the positioning of the shift bar 32 as described hereinafter.

Figure 2:
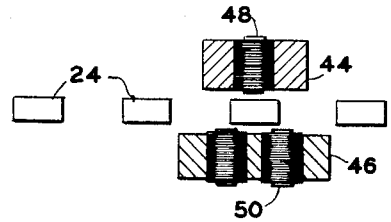
Figure 2 is a sectional view of the transducer mechanism by which relative motion of the parts is converted into an electrical signal.

Mounted on the top surface 40 of shift bar 32 are fifteen identical transducers 42. These transducers 42 are equally spaced on shift bar 32 each at an interval of one-fifteenth less than the spacing of two of the armatures 24. This gives a vernier correspondence or relationship between the transducer 42 and the armatures 24. The transducers 42 (see also Figure 2) have an upper arm 44 and lower arm 46, respectively, which project inwardly toward the axis of table 10 and are spaced apart a sufficient distance to allow armatures 24 to pass therebetween. The upper arm 44 carries a single exciter coil 48, and lower arm 46 carries two pick-up coils 50, said coils all cooperating as hereafter described.

Figure 3:
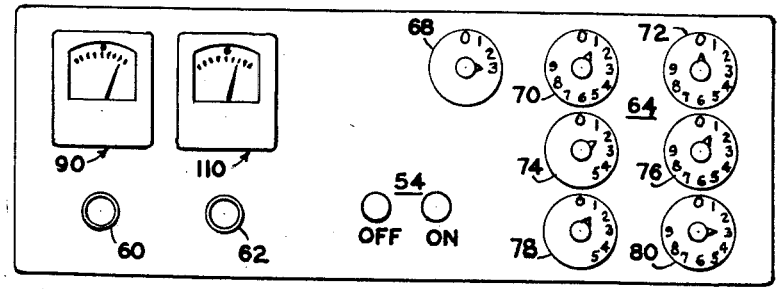
Figure 3 shows the control panel on the index table including the position indicating means and the position switches.

A control panel 52 (see Figure 3) is mounted on the front portion of base 12. This control panel 52 carries a power switch 54, coarse position and fine position indicating meters 90 and 110, respectively, a coarse position indicating light 60, and an "on point" light 62. Also mounted on control panel 52 are the adjusting knobs 64 of a position switch bank 66 described below.

The position switch bank 66 (see Figures 4 and 5) consists of a number of rotary switches each having a plurality of wafers studded with contact points. Associated with each wafer is a wiper arm and all the arms are carried on a central shaft and rotatable about the shaft axis by a control knob to electrically engage respective contact points. The knobs are turned to select the desired position of the table 10 with respect to base 12. In the embodiment shown, the position of table 10 with respect to base 12 can be designated by an angle of displacement measured in degrees, minute and seconds of arc. An important attribute of my invention is the accuracy with which this may be determined. For instance, in a table 10 of about forty inches diameter, I may locate to one second of arc or .0001 of an inch of circumference. Any angle is therefore distinctly represented by the separate digits in proper order on the switch dials which comprise the measurement of the angle in degrees, minutes and seconds. For this reason, seven switches 68, 70, 72, 74, 76, 78 and 80 are used. Switches 68, 70, and 72 (see also Figure 3) have been arbitrarily placed on the top row of control panel 52 and are set up for the degrees of the desired angle. Likewise, switches 74 and 76 in the second row are used for the minutes, and switches 78 and 80 in the bottom row for seconds. Thus, when all seven switches are set to a preselected setting, a precise position of the table accurate to one second of arc has been chosen out of the entire 360° of the circumference. As stated, each of the wafer switches has several wafers, these wafers being indicated by appropriate letters added to the switch members.

There are two steps involved in locating the table 10 in the selected position. The first or coarse position step is obtained by a bridge circuit. Two sides of this bridge are composed by the rotary potentiometer 26 as divided by the wiper 28. The other two sides are formed by resistors wired to wafers 68a, 70a, 72a and 74a and connected in series, and similar resistors in series on wafers 68b, 70b, 72b, and 74b. On each of the wafer groups 68a and 68b, 70a and 70b, 72a and 72b, and 74a and 74b, the sum of the resistors will be a constant value, thereby forming by virtue of the disclosed drawing circuit a stepwise variable potentiometer means. The resistors are arranged in decades and held to a close tolerance to insure careful accuracy on this point. Thus, it can be seen that for every setting of the wafer switches 68, 70, 72 and 74, there will be a position of wiper arm 28 on potentiometer 26 at which the bridge will be balanced.

The output of this bridge circuit is connected to the input of an amplifier 82, whose power supply is furnished by lines 84 and 86 from power transformer 88. The output of this amplifier is connected to a coarse position indicating meter 90 which is zeroed at the center of its range. Depending upon the direction of the unbalance between the wafer switch sides and the rotary potentiometer sides of the bridge, the meter will read on one side or the other of zero. The operator then turns hand wheel 22 in the proper direction to move wiper arm 28 on potentiometer 26 so that the bridge circuit becomes balanced. When a balance is reached, coarse position meter 90 will be centered. At this point a coarse null position relay 92, also connected to the output of amplifier 82, will become deenergized. This closes normally closed contacts 92a to turn on a coarse position indicating light 60 connected to power lines 84 and 86. This light lets the operator know that he is within approximately 20 minutes of arc of the final position and brings into use the fine position indicating means as described hereinbelow.

It has been necessary to use both a coarse position indicating means and a fine position indicating means because of the inability of the transducers to distinguish between the individual armatures 24. Because the armatures 24 are identical, a transducer can only subdivide a given preselected degree of arc. Also, because of the symmetrical position of the transducer coils 50 in a transducer 42, a balanced reading is produced both when an armature is centered between them and when armatures are spaced an equal distance on each side with an air gap inbetween. Since this creates null readings for a gage head at 30 minute intervals of arc, a coarse positioning, such as has been explained above, must be used first to bring the table within less than 30 minutes of the required position.

Figure 5:
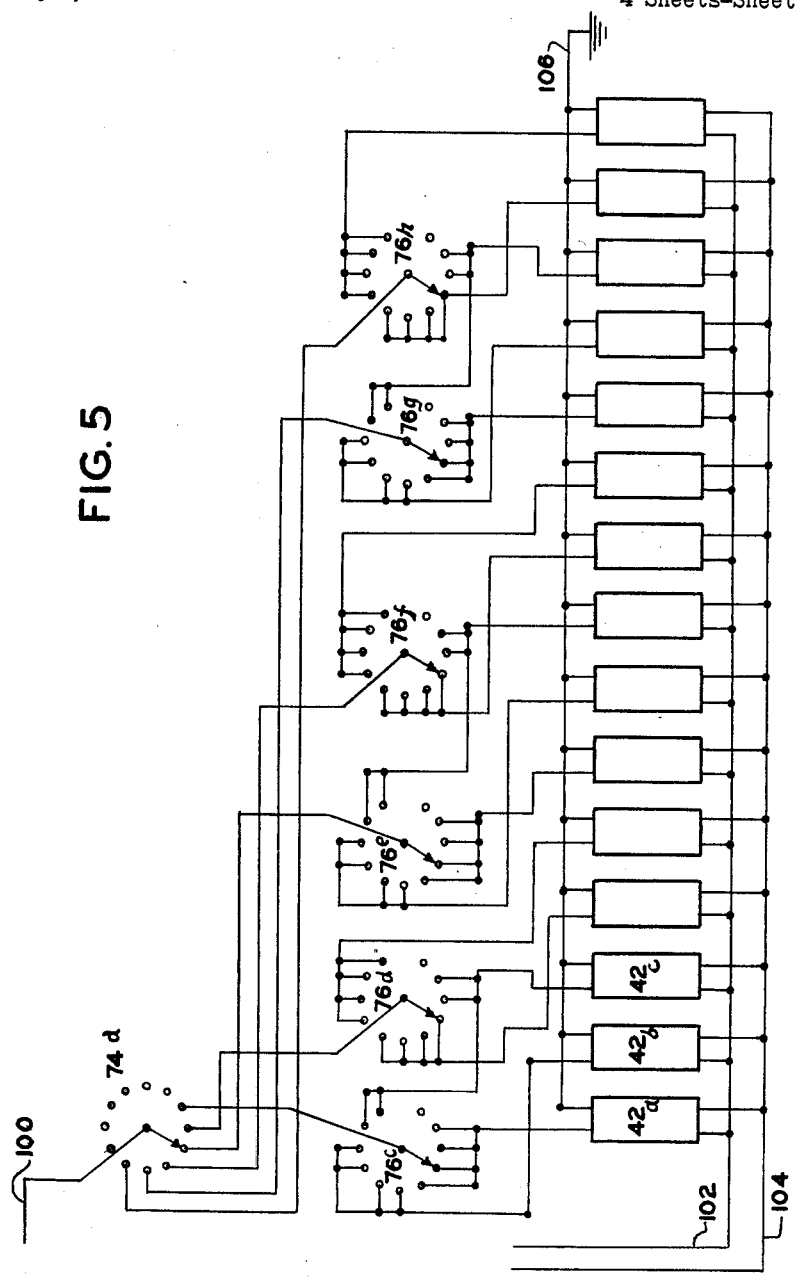
Figure 5 is a wiring diagram showing the balance of the circuit.

As indicated above, due to the fact that there are 360 armatures 24, the vernier differential in the spacing of the transducers 42 on shift bar 32 is one-fifteenth of a degree or four minutes of arc. This, therefore, gives each transducer a particular range of four minutes out of a whole degree, and if the minutes setting is within a given range, the appropriate transducer will be selected. Accordingly, a switching circuit shown in Figure 5 is used to select the proper transducer. This circuit consists of wafer 74d of rotary switch 74 and wafers 76c, 76d, 76e, 76f, 76g, and 76h of rotary switch 76.

Figure 4:
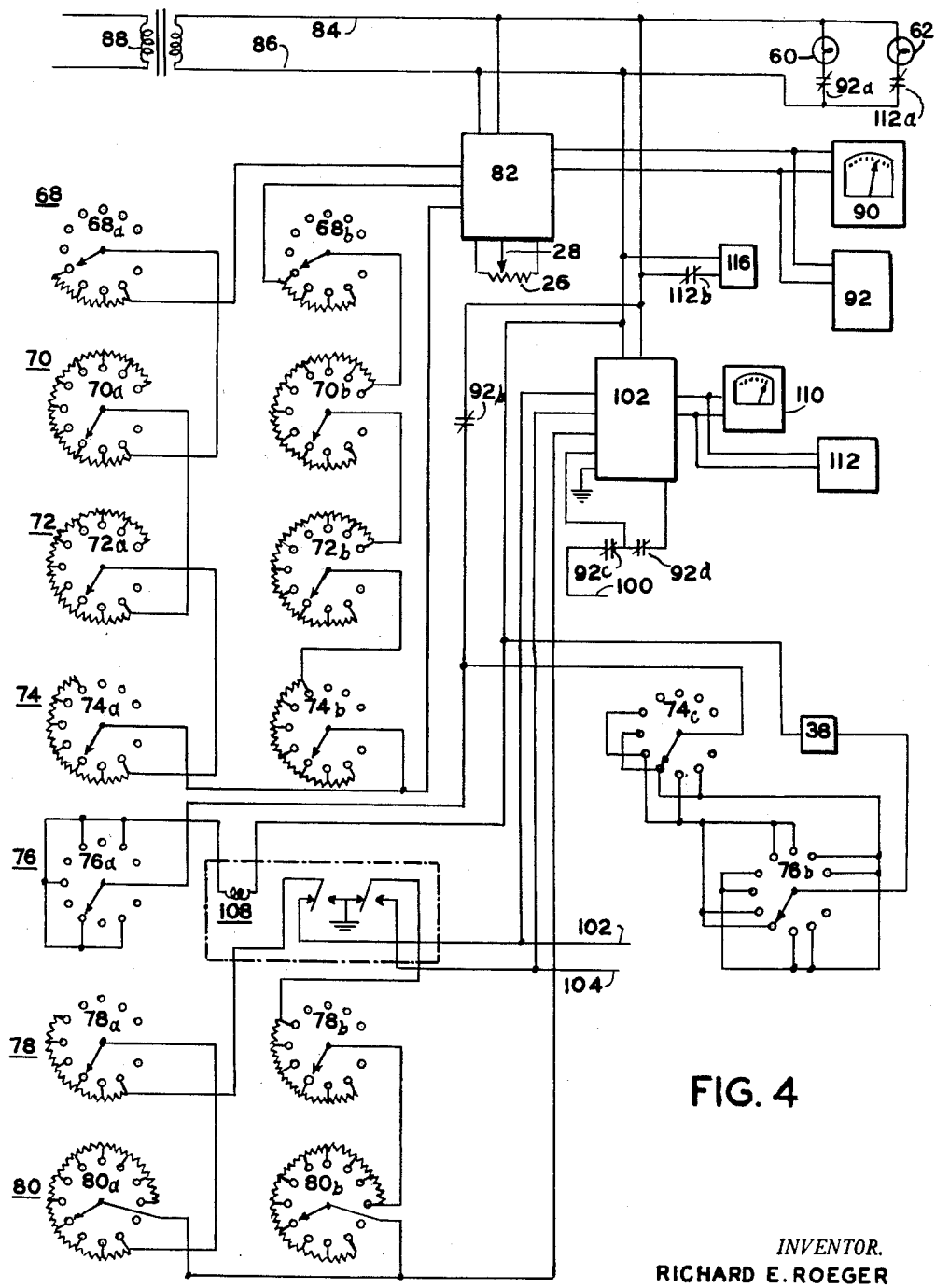
Figure 4 is a partial view of the wiring diagram showing part of the electrical circuit used in this embodiment of the present invention.

Wire 100 carries the output of the selected transducer from the center tap of wafer 74d to the input of the fine position indicating amplifier 102 (see Figure 4). The separate taps on wafers 74d are in turn connected to the center tap of the wafers of switch 76. The first four taps on wafer 76c are connected to transducer 42a, the second four to transducer 42b, the last two on wafer 76d, and the first two on wafer 76d to transducer 42c, etc. Since switch 74 is for the tens digit of the minute setting of the selected angle, and switch 76 is for the ones digit, it will be seen that for the values of 0 through 3 minutes, transducer 42a is used, for 4 through 7 minutes transducer 42b, and for 8 through 11 minutes transducer 42c, etc. will be used. Thus, when the desired angle of the index table 10 is set up on switch bank 64, the setting of switches 74 and 76 determine which of the fifteen transducers will be used for the fine positioning.

The range of each transducer is reduced by a factor of two by the position of shift bar 32. In a manner similar to the operation of the transducer selecting switches of Figure 5, wafers 74c and 76b determine whether or not shift bar solenoid 38 will be energized. The connection between wafers 74c and 76b show that for settings of 0, 1, 4, 5, 8, 9, etc. minutes solenoid 38 will be energized, thereby holding shift bar 32 up against left end stop 34. For angles of 2, 3, 6, 7, 10, 11 etc., minutes solenoid 38 will remain deenergized and spring means (not shown) hold shift bar 32 up against right end stop 36.

In the operation of a transducer 42, the exciter coil 48 of the particular transducer is supplied with an alternating current by lines 102 and 104 from amplifier 102. The corresponding pickup coils 50 are connected in opposition so that the magnitude of the current from coils 50, one side 106 of which is grounded and the other side of which is connected through the head selector circuit to wire 100, will vary with the magnitude of the displacement of an armature 24 from the mid-point between the axes of the coils 50. The direction of the displacement is determined by the phase of the output current. Therefore, the position of the armature 24 within the transducer 42 is revealed by both the phase and magnitude of the output from pickup coils 50.

Since the transducers remain fixed except for the movement of shift bar 32, it is apparent that the selected position of the table 10 and hence a particular armature 24 will be distinctive of a unique signal at the input of amplifier 102. To determine if this signal is correct, a bucking signal of equal magnitude but opposite phase is also applied to the input of amplifier 102. The magnitude of this bucking signal is determined by a balancing bridge of resistors on wafers 78a, 80a, 78b, and 80b, in a manner similar to the operation of wafers 68a, 70a, 72a, 74a, 68b, 70b, 72b and 74b for the coarse positioning. The phase of this bucking voltage is determined by the energization of relays 108. Wafer 76a of switch 76 energizes relay 108 for even-numbered minutes of arc and renders it deenergized for the odd-numbered minutes of arc and renders it deenergized for the odd-numbered minutes. Accordingly, relay 108 reverses the polarity of the bucking signal supplied also from lines 102 and 104. It is to be noted that a contact 92b of coarse position relay 92 prevents both solenoid 38 and relay 108 from being operable unless a coarse position has been located.

The input to amplifier 102 consists of the combination of the transducer signal and the bucking signal. The difference between them is applied to a fine position indicating meter 110 which tells the operator how far off position the table is. The operator then moves the table so that meter 110 is zeroed to indicate that the table is in the proper position, at which point fine position relay 112 is deenergized. This closes normally closed contact 112a to turn on "on position" light 62 to indicate that the table has been properly positioned, and also closes contact 112b to energize a clamp 116 which holds the table in this position.

Because, as stated above, the fine positioning circuit cannot distinguish individual degrees, it is important that relay 112 remain energized if a null signal should be produced in the fine position amplifier 102 at the wrong degree. To attain this result, coarse position relay 92 has been provided with a normally closed contact 92c which leaves the transducers disconnected from the amplifier 102 until a coarse null has been reached together with a normally open contact 92d which applies an internal voltage to amplifier 102 so that there will be a sufficient output to maintain relay 112 energized.

While I have described the operation of the indexing table only with respect to its use for locating the table in a predetermined position with respect to the base, it may also be used in the reverse manner, that is, if the table is fixed in an unknown position, this position may be accurately located. To accomplish this, the operator, leaving the table stationary, goes through the same process of locating first a course null and then a final fine position null by changing the settings of the rotary switch bank 64. Starting with the hundreds of degrees switch, this is set to the value that leaves the coarse position meters closest to null, and the same process is continued with the rest of the degrees and minutes switches. These switches produce a coarse null, after which the seconds switches may be used to obtain the fine null, in the manner described above.

The accompanying drawings and foregoing specification will enable those skilled in the art to practice this invention. While I have described only one embodiment of my invention, it is to be understood that other modifications and arrangements, employing varying combinations of parts and adapted for linear or rotary positioning, may be resorted to without departing from the scope and spirit of this invention which is to be limited only by the following claims.

I claim:

1. Position indicating means comprising: a first element; a second element movable relative to said first element; a plurality of regularly spaced armatures secured to one of said elements; and a plurality of regularly spaced transducers secured to the other of said elements, said transducers having a vernier correspondence to said armatures and being adapted to cooperate with said armatures to produce a signal quantitatively varying with and indicative of the relative position of an armature and a transducer.

2. Position indicating means comprising: a first element; a second element movable relative to said first element; a plurality of regularly spaced armatures secured to one of said elements; a plurality of transducers secured to the other of said elements, said transducers having a vernier correspondence to said armatures; null signal indicating means; and means to selectively connect the output of one of said plurality of transducers to said null signal indicating means.

3. An indexing table comprising: a base; a turntable rotatably secured to said base; electrical null indicating means; a plurality of equally spaced armatures fixedly secured to said turntable; a plurality of transducers secured to said base in vernier relationship with said armatures; and means to selectively connect at least one of said transducers to said electrical null indicating means.

4. Position indicating means comprising: a first element; a second element movable relative to said first element; a plurality of regularly spaced armatures secured to said second element; a plurality of transducers secured to said first element in vernier correspondence to said armatures; coarse positioning means adapted to position a selected series of said armatures adjacent said transducers; fine position null indicating means; means to selectively connect one of said transducers to said fine position null indicating means; and means to supply a preselected bucking voltage to said fine position null indicating means to cancel the signal from a selectively connected transducer when a selected armature is properly positioned with respect to said selectively connected transducer.

5. An indexing table comprising: a base; a turntable rotatably secured to said base; a rotary potentiometer secured to said base, the wiper of said potentiometer being fixed to said turntable; a plurality of equally spaced lug shaped armatures fixedly secured to said turntable and projecting radially therefrom; an arcuate shift bar slidably secured to said base; means to slide said shift bar in an arc concentric with said turntable; a plurality of transducers fixedly secured to said shift bar in vernier relationship with said armatures, each of said transducers having an exciter coil mounted on one side of said armatures and two pick up coils oppposedly wound mounted on the opposite side of said armatures; a plurality of switches whose positions correspond to the angular positions of said turntable; resistors associated with said switches, said resistors being connected in combination with said rotary potentiometer to form a null bridge; a coarse position null indicating amplifier connected to the output of said null bridge; coarse null position indicating means responsive to the output of said coarse position amplifier; a fine position null indicating amplifier; means to slide said shift bar responsive to the position of said switches; means for selectively connecting one of said transducers to the input of said fine position amplifier responsive to the position of said switches; means responsive to the position of said switches to provide a predetermined voltage adapted to oppose the output voltage of said selected transducer; fine null position indicating means responsive to the output of said fine null position amplifier; means to clamp said turntable in a fixed position with respect to said base; and means to rotate said turntable relative to said base.

6. Position locating means comprising: a first element; a second element movable relative to said first element; a plurality of armatures spaced apart and secured to one of said elements; a plurality of transducers secured to the other of said elements and spaced apart to provide a vernier correspondence to said armatures; means to preselect and energize a transducer to provide a signal; means to pre-select and position an armature within the signal band of said transducer; means to center said armature relative to said transducer; and means to provide a signal equal to said armature centered transducer signal and of opposite phase; means to connect said signals in opposition; and means responsive to said opposed signals to provide a null position indicating signal.

7. In an indexing table having a base, a turntable rotatably secured to said base, and means to index said turntable, the improvement in said indexing means comprising: a plurality of armatures secured to said turntable, said armatures being circularly arrayed adjacent the periphery of said turntable and equally spaced apart one from the other; a plurality of transducers secured to said base and arcuately arrayed thereon, said transducers being equally spaced apart one from the other, the spacing between said armatures being greater than the spacing between said transducers thereby to provide a vernier correspondence therebetween; and means to selectively energize one of said transducers to produce a position indicating signal.

8. Position locating means comprising: a first element; a second element movable relative to said first element; a plurality of armatures spaced apart and secured to one of said elements; a pluarlity of transducers secured to the other of said elements and spaced apart to provide a vernier correspondence to said armatures; means to move one element relative to the other element to provide vernier adjustment between said armatures and said transducers; and means to select the output of one of said transducers as a position indicating signal.

9. Position locating means comprising: a first element; a second element movable relative to said first element; a plurality of armatures spaced apart and secured to one of said elements; a plurality of transducers secured to the other of said elements and spaced apart to provide a vernier correspondence to said armatures; means to move one element relative to the other element to provide vernier adjustment between said armatures and said transducers; null signal indicating means; and means to energize and selectively connect one of said transducers to said null signal indicating means, whereby said selected transducer and said null signal indicating means cooperate to provide a null position indicating signal.

10. Position locating means comprising: a first element and a second element, one of said elements being movable relative to the other of said elements; a plurality of armatures equally spaced apart and secured to one of said elements; a plurality of transducers secured to the other of said elements and spaced apart to provide a vernier correspondence to said armatures; element moving means to approximately align a pre-selected series of armatures with a corresponding series of transducers; means to energize said transducers to produce at each transducer an output signal indicative of position relative to an armature; and means to select the transducer nearest to an adjacent armature and to effect relative movement of said elements to vary said signal until one element is located at a pre-selected position with respect to the other element.

11. Position locating means comprising: first and second elements movable relative to each other; a plurality of armatures equally spaced apart and secured to one of said elements; a plurality of transducers secured to the other of said elements and spaced apart to provide a vernier correspondence to said armatures; means to approximately align a pre-selected number of armatures with a like number of transducers; means to selectively energize one of said transducers to produce a signal; means to shift the nearest adjacent armature to vary said signal; and means to supply a pre-selected signal of opposite phase to cancel said transducer signal when said armature is properly positioned with respect to said transducer.

12. Position locating means comprising: first and second elements movable relative to each other; a plurality of armatures equally spaced apart and secured to one of said elements; a plurality of transducers secured to the other of said elements and spaced apart to provide a vernier correspondence to said armatures; a potentiometer resistance a potentiometer wiper secured to respective ones of said elements; a plurality of resistors connected in combination with said potentiometer to form a bridge; means to pre-select at least one of said resistors; means to shift one of said elements relative to the other until said pre-selected resistor and said potentiometer balance said bridge; means to energize one of said transducers to provide a signal; means to shift the nearest adjacent armature to vary said signal; and means to supply a preselected signal of opposite phase to cancel said transducer signal when said armature has been shifted to a predetermined position.

13. A position locating mechanism comprising: position indicating means; a first element; a second element movable relative to said first element; a plurality of regularly spaced armatures secured to one of said elements; and a plurality of regularly spaced transducers secured to the other of said elements, said transducers having a vernier correspondence to said armatures; means to selectively connect one of said transducers to said position indicating means; and means to energize said one of said plurality of transducers, the energized transducer being adapted to co-act with said armatures and said position indicating means to produce a position indicating signal.

14. Position indicating means comprising: a first element; a second element movable relative to said first element; armature means secured to said first element; transducer means secured to said second element; coarse positioning means adapted to position said armature means relative to said transducer means; fine position indicating means; means to selectively connect said transducer means to said fine position indicating means, said transducer means being adapted to co-act with said armature means and said fine position indicating means to produce a position indicating signal; and means to supply a pre-selected reference voltage to said fine position indicating means to modify the signal from said transducer means.

15. Position indicating means comprising: a first element; a second element movable relative to said first element; a plurality of armatures secured to said first element; a plurality of transducers secured to said second element; coarse positioning means adapted to selectively position said plurality of armatures relative to said plurality of transducers; fine position indicating means; means to selectively connect one of said transducers to said fine position indicating means, said transducer being adapted to co-act with said armatures and said fine position indicating means to produce a position indicating signal; and means to supply a pre-selected reference voltage to said fine position indicating means to modify the signal from said transducer.

References Cited in the file of this patent

UNITED STATES PATENTS

| | | |
|---|---|---|
| 2,694,804 | Wagner | Nov. 16, 1954 |
| 2,780,040 | Goehring | Feb. 5, 1957 |

UNITED STATES PATENT OFFICE

CERTIFICATE OF CORRECTION

Patent No. 2,926,345 February 23, 1960

Richard E. Roeger

It is hereby certified that error appears in the printed specification of the above numbered patent requiring correction and that the said Letters Patent should read as corrected below.

Column 2, line 23, for "ram" read -- arm --; line 42, for "transducer" read -- transducers --; column 4, line 7, for "water" read -- wafer --; line 61, for "relays" read -- relay --; line 63, after "minutes" insert a period; same line 63 and line 64, strike out "of arc and renders it deenergized for the odd-numbered minutes."; column 7, line 53, after "resistance" insert -- and --.

Signed and sealed this 13th day of September 1960.

(SEAL)
Attest:

KARL H. AXLINE
Attesting Officer

ROBERT C. WATSON
Commissioner of Patents